United States Patent [19]

Nien et al.

[11] Patent Number: 5,305,226

[45] Date of Patent: Apr. 19, 1994

[54] METHOD FOR TRANSFERRING WORKING CONDITIONS PARAMETERS OF COMPUTER NUMERICAL CONTROL ELECTRIC DISCHARGE MACHINING DEVICES

[75] Inventors: Yung-Feng Nien, Kaohsiung; Chang-Fang Su, Hsinying, both of Taiwan

[73] Assignee: Industrial Technology Research Institute, Taiwan, Taiwan

[21] Appl. No.: 763,323

[22] Filed: Sep. 20, 1991

[51] Int. Cl.$^5$ .......................... G06F 15/46; B23P 1/08
[52] U.S. Cl. ................................ 364/474.04; 364/147; 219/69.17
[58] Field of Search .................... 364/147, 192, 474.04; 219/69.11, 69.12, 69.17

[56] References Cited

U.S. PATENT DOCUMENTS

| | | | |
|---|---|---|---|
| 4,071,729 | 1/1978 | Bell, Jr. | 364/474.04 |
| 4,335,436 | 6/1982 | Inoue | 364/474.04 |
| 4,490,781 | 12/1984 | Kishi et al. | 364/191 |
| 4,606,007 | 8/1986 | Inoue | 364/474.04 |
| 4,685,064 | 8/1987 | Kinoshita et al. | 364/474.04 |
| 4,970,363 | 11/1990 | Obara | 219/69.12 |

Primary Examiner—Jerry Smith
Assistant Examiner—Paul Gordon
Attorney, Agent, or Firm—Scully, Scott Murphy & Presser

[57] ABSTRACT

A method for transferring working conditions parameters of computer numerical control discharge machining devices comprises the steps of inputting the machining, editing the programmable ladder, using the ladder to simulate hardware and establishing the I/O port for transferring the working conditions parameters. Transferring working conditions parameters is done by two kinds of signals, data signals and a strobe signal. The number of the output terminals for these two signals are determined by the number of the working conditions parameters and the variations thereof. The ladder is edited in the programmable logic controller of the computer numerical control system and the working conditions parameters are on-line transferred out from the I/O port by using the combination of the data signals and the strobe signal so as to be able to use the least number of output terminals to transfer the most number of parameters and to be fit for all kinds of power supply systems made by different manufacturers.

3 Claims, 4 Drawing Sheets

METHOD FOR TRANSFERRING WORKING CONDITIONS PARAMETERS OF COMPUTER NUMERICAL CONTROL ELECTRIC DISCHARGE MACHINING DEVICES

BACKGROUND OF THE INVENTION

This invention relates to a method for transferring working conditions parameters of computer numerical control (CNC) machines and in particular to one for transferring the working conditions parameters of a computer numerical control EDM (electric discharge machining) device by using the PLC (programmable logic controller) ladder under the control of the CNC system to simulate the output signals generated by hardware so as to transfer the most working conditions parameters with the least output terminals.

For the machine manufacturing industry, conventional machining is significantly dependent upon the experience of workers. With the advent of the CNC machines, high machining precision can be repeatedly achieved not only by experienced workers but also by inexperienced workers with CNC machines, such as a CNC wire EDM and a CNC EDM device. An EDM device uses electric sparks and arcs to erode and thus remove metal from a work piece. The energy of the discharge directly affects the working efficiency, electrode wear and surface roughness of the work piece. Therefore it is necessary to adjust the discharge parameters, such as ON time, OFF time, high voltage current, low voltage current, gap voltage and servo sensitivity, so as to obtain the optimum machining. In an automatic system, the controller has to control not only the feed of the machine tools but also the change and switch of parameters in different machining periods. The conventional EDM device and the NC (.numerical control) EDM device, even some of the CNC EDM devices, although being capable of adjusting the parameters, possess different disadvantages. For example, (1) For the conventional EDM device, it needs a complicated control panel which is difficult to operate and has to be operated manually and furthermore its sophistication in wiring and arranging elements increases the manufacturing cost;

(2) For the NC EDM device, it needs hardware to set, store and transfer working conditions parameters and because of the hardware, it is hard to modify and expand and is inflexible;

(3) For the general CNC EDM device, its control is done by direct I/O (input/output) and thus needs a great number of output terminals for transferring data which increases the sophistication of wiring.

Since EDM comprises a variety of working conditions parameters and each parameter has several different variations, choosing an efficient way to transfer working conditions parameters is of vital importance for automatization.

SUMMARY OF THE INVENTION

It is therefore an object of the present invention to provide a method for transferring working conditions parameters of computer numerical control electric discharge machining devices which simulates outputs of hardware with the programmable ladder of the PLC module of CNC system to send out the most working conditions parameters with the least output terminals.

It is another object of the present invention to provide a method for transferring working conditions parameters of computer numerical control electric discharge machining devices in which the wiring arrangement is greatly simplified and which fits for transferring different parameters without any change or modification of the hardware.

It is a further object of the present invention to provide a method for transferring working conditions parameters of computer numerical control electric discharge machining devices which fits for multi-parameter high-precision machining processes, such as EDM, EDWC (electrical discharge wire cutting) and laser machining.

These and other objects, advantages and features of the present invention will be more fully understood and appreciated by reference to the written specification and appended drawings.

DETAILED DESCRIPTION OF THE INVENTION

Figure 1:
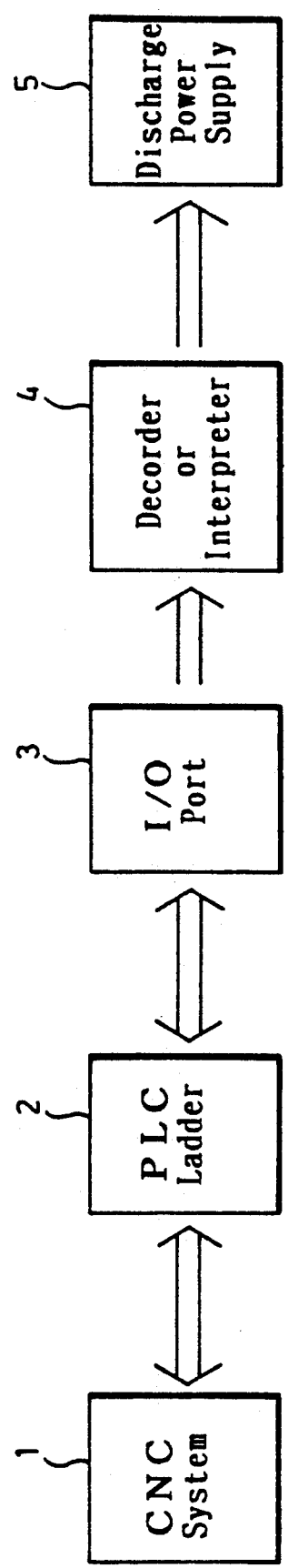
FIG. 1 is a system block diagram of an EDM process which applies the parameter transferring method in accordance with the present invention.

With reference to the drawings and in particular to FIG. 1, which is a block diagram showing an application of the present invention in an EDM process, a CNC control system 1 determines the number of output terminals of the desired data signals and strobe signals in accordance with the number and variations of the discharge parameters, and then uses a PLC ladder 2 to edit the desired signals. The PLC ladder sends out the edited signals via an I/O port 3. These signals are then decoded or interpreted by a decoder circuit or an interpreter circuit 4 and then used to control a discharge power supply 5.

Figure 2:
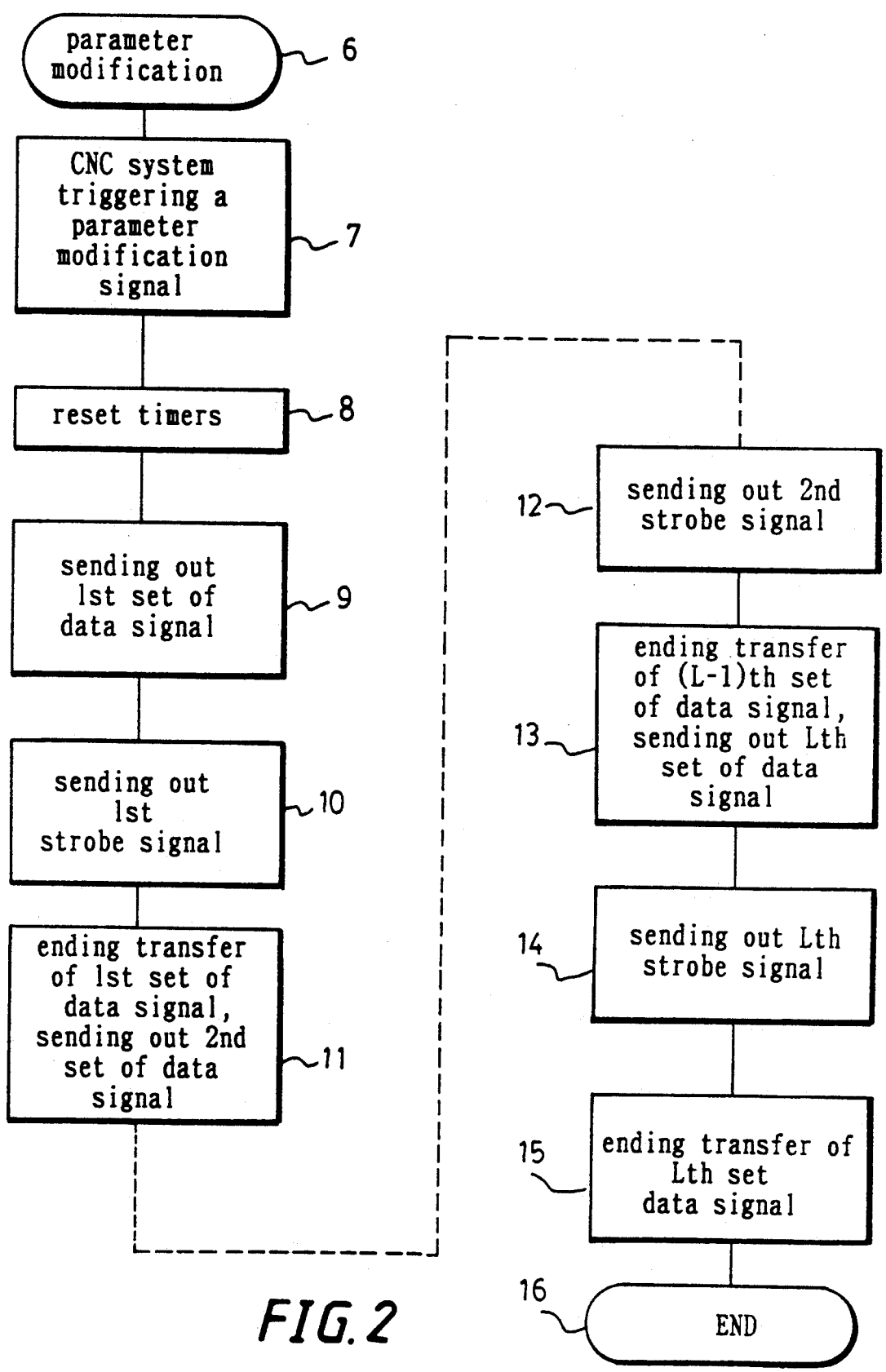
FIG. 2 is a flow chart of the parameter transferring method in accordance with the present invention.

Referring now to FIG. 2, which shows a flow chart of the invention, in the parameter modification step 6, the desired modifications of parameters are input. Then in the next step, the CNC system will trigger a parameter modification signal (step 7) to initiate the modification and the CNC system then reset the system timers (step 8). Next, it sends out the first set of data signals (step 9) and the first strobe signal corresponding to the first set of data (step 10) and then ending the transfer of the first set of data signals if sending out the second set of data signals (step 11), followed by sending out the second strobe signal corresponding to the second set of data (step 12). The steps of sending out data signals and the strobe signal corresponding thereto and then ending the data transfer are cyclically repeated until the Lth set of data signals and the corresponding strobe signal are sequentially sent out (steps 13 and 14) and the transfer of the Lth set of data signals are ended (step 15). The procedure is then ended in step 16.

Figure 3:
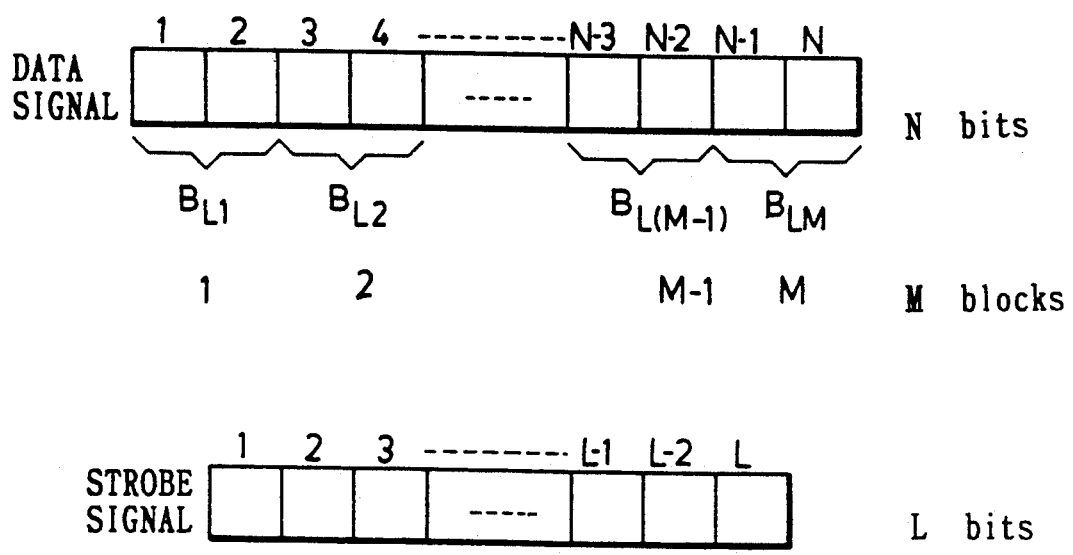
FIG. 3 is a diagram showing the construction of the data signals and strobe signals in accordance with the present invention.

In FIG. 3, the formation of data signals in accordance with the present invention is shown. Binary coding is used herein as an example. Taking a data signal having N bits as an example If there are M groups of parameters to be described with this data signal, then the N bits are further divided into M blocks. Each block is associated with a parameter and contains different number of bits in accordance with the variations thereof If a strobe signal contains L bits and when the strobe signal is output bit by bit (which is a timing diagram of the transfer of data signals), then M groups of parameters can be transferred a total number of L times. If the number of bits contained in the Mth block of the Lth data signal is respectively denoted by the symbol $B_{LM}$, then the parameter described by the Mth block of the Lth data signal can have $2^B LM$ variations in total, since binary coding is adapted herein If a parameter has a great number of variations, then M can be set to one and thus the number of variations associated therewith is $2^N$.

Furthermore, since the present invention uses only the basic elements of a PLC ladder, such as coils, contacts and timers, and since the ladder is programmable, the present invention is fit for the adjustment of parameters corresponding to the discharge of a power supply of any kind. It is also easy to modify and expand.

Figure 4:
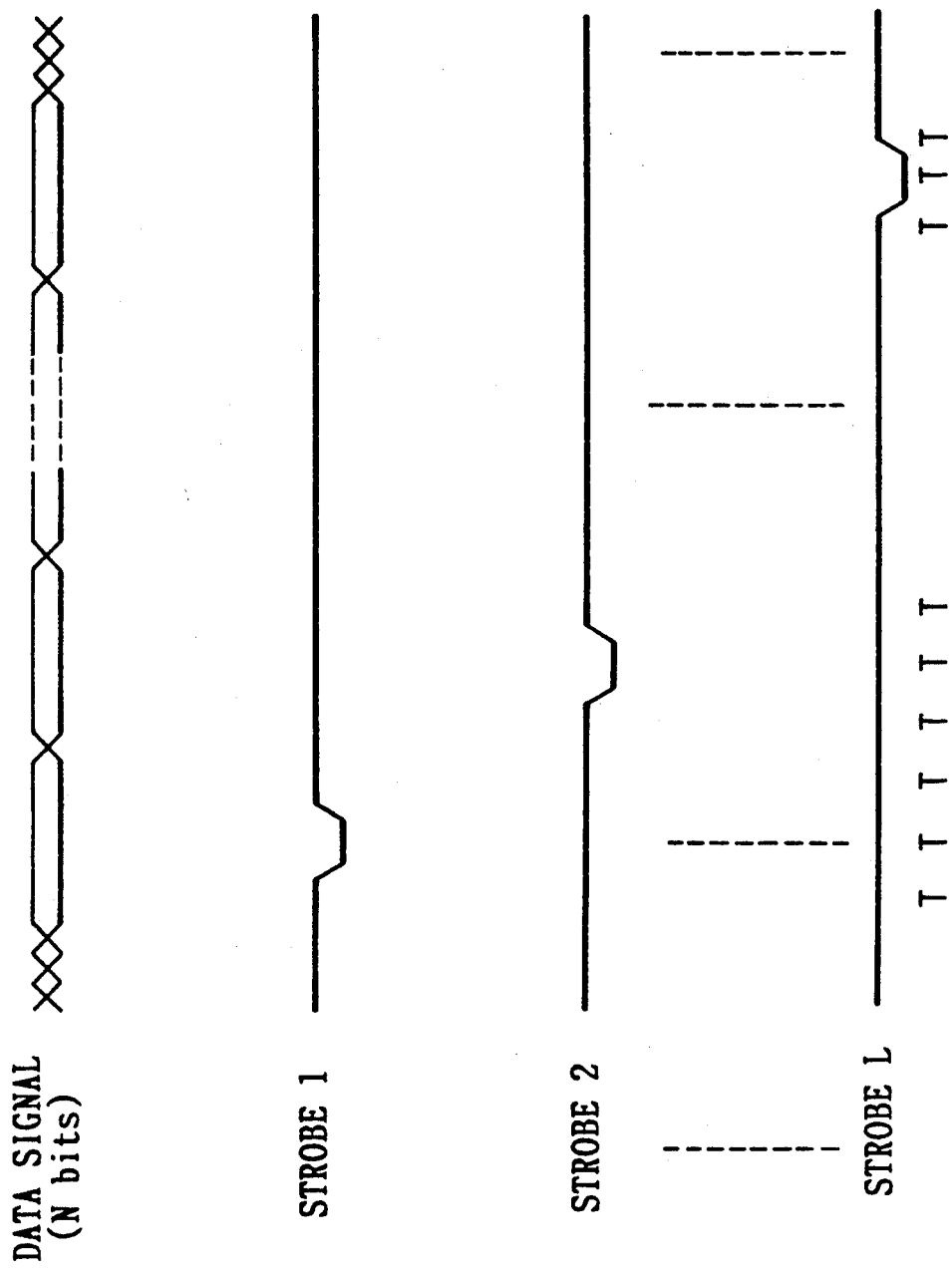
FIG. 4 is a timing diagram of the present invention.

In FIG. 4, a timing diagram of the transfer of data signals is shown. The strobe signal sequentially initiates the transfer of a data signal and thus transfers the parameters. The hardware used in a NC EDM device to store the parameters can be replaced by the PLC ladder. The data signals are preferably transferred in a parallel way to increase the efficiency and simplify the interpreter circuit or the decoder circuit.

To further describe the method of the present invention, an example is given as follows. Consider a discharge power supply system comprising six parameters—ON time, OFF time, high voltage current, low voltage current, gap voltage and servo sensitivity. By using the present invention, only the number of variations of each parameter is needed instead of understanding the actual contents of each parameter. Therefore, the method of the present invention is fit for power supply systems made by different manufacturers. Suppose each parameter has at most sixteen variations, then, in accordance with the binary coding, each parameter needs four bits ($16 \leq 2^4$) to describe. Two obvious options can be obtained.

(a) If each data signal contains only four bits (N=4), then the number of blocks (M) is one and since there are six parameters, the strobe signal needs six bits (L=6) to express all the parameters.

(b) If each data signal contains eight bits (N=8) and these eight bits are divided into two blocks (M=2), then the strobe signal needs only three bits (L=3) to transfer the six parameters.

Since the data signal and strobe signal are chosen to be transferred in a parallel way, each bit of each signal needs an output terminal in the I/O port. The numbers of bits of the data signal and strobe signal determine the number of output terminals, i.e. N+L. Therefore, option (a) needs 10 output terminals and option (b) needs 11 output terminals.

The numbers of the coils and timers can be obtained from the numbers of bits of the data signal and the strobe signal In the PLC ladder, each output terminal of the data signal needs a coil. That is, N coils for the data signal having N bits. To output a bit of the strobe signal, three timers are needed That is L times three timers for the strobe signal having L bits.

In option (a), only ten output terminals are needed, but it needs eighteen (L×3=6×3=18) timers. In option (b), it needs eleven output terminals and nine (3×3=9) timers. Therefore, option (b) is better. As a matter of fact, option (b) also has a simpler PLC ladder.

In FIG. 4, the symbol "T" denotes a timing cycle. Three timers are needed for outputting a bit of a strobe signal which is then used to trigger the other bits so as to transfer the data signal to the interpreter or decoder circuit The interpreter circuit or decoder circuit needs only to latch the data signal and interpret or decode the data signal to complete the adjustment of the parameters. Therefore, once the parameters are to be modified, the data signals can be on-line initiated immediately to complete the adjustment.

It is apparent that although the invention has been described in connection with an example of a CNC EDM device, it is understood that those skilled in the art may make changes to certain features of the described example or apply the above-described method to other machines without departing from the spirit and scope of the invention as defined in the append claims.

We claim:

1. A method for transferring working conditions parameters of computer numerical control electric discharging machining devices comprising the steps:

inputting a number of working conditions parameters to a programmable logic controller, each of said working conditions parameters having a plurality of variations thereof;

editing said programmable logic controller to construct a set of data signals and a set of strobe signals corresponding to said working conditions parameters; and transmitting said data signals and strobe signals in combination, via an I/O port having a number of output terminals, to a receiving device to effect an on-line transfer of said working conditions parameters, for controlling said electric discharge machining devices, and including the step of transmitting one of the set of strobe signals to identify an end of each of the set of data signals;

wherein the number of output terminals of the data signals and strobe signals is determined by the number of said working conditions parameters and said variations thereof processed by said programmable logic controller.

2. A method as claimed in claim 1, wherein binary coding is adapted to represent the parameters and the variation thereof.

3. A method as claimed in claim 1, wherein said strobe signal determines an output timing diagram for outputting said data signals and these signals are output in a parallel way.

* * * * *